Jan. 21, 1930.  A. MOORHOUSE  1,744,136
WINDOW SHADE SUPPORT FOR MOTOR VEHICLES
Filed May 28, 1923
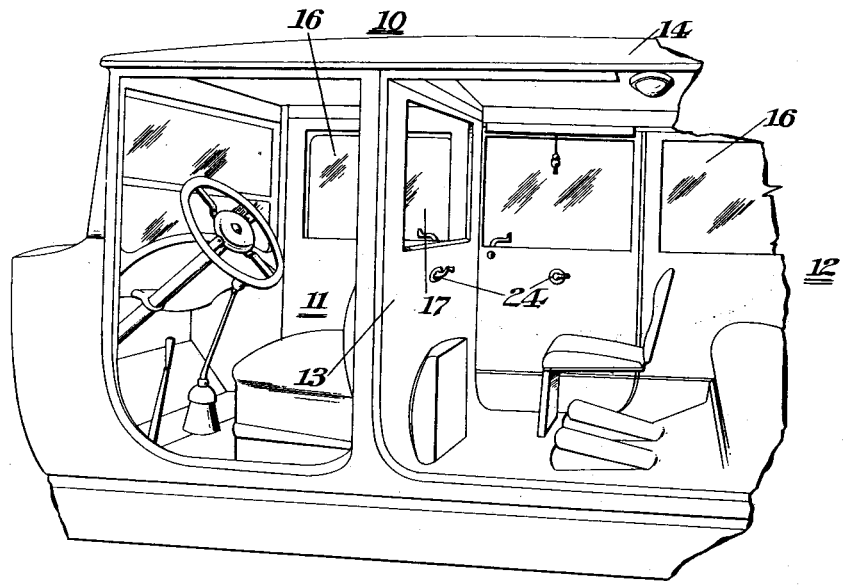
Fig.1
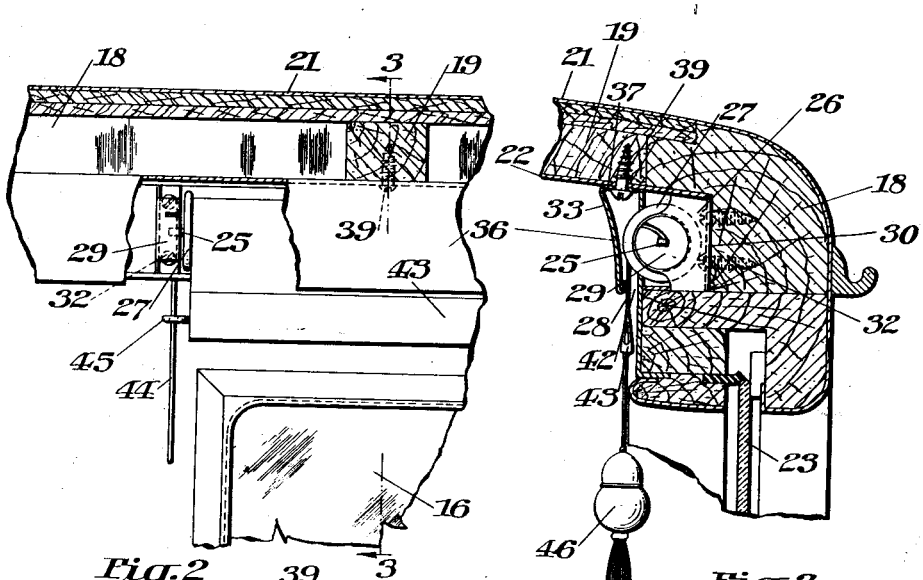
Fig.2
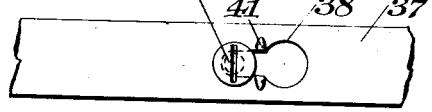
Fig.4
Fig.3
INVENTOR:
Alfred Moorhouse,
BY
ATTORNEY.

Patented Jan. 21, 1930

1,744,136

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

WINDOW-SHADE-SUPPORT FOR MOTOR VEHICLES

Application filed May 28, 1923. Serial No. 641,815.

This invention relates to motor vehicles and more particularly to the body fittings thereof.

It has for an object to provide supporting means for the window shades of closed motor vehicle bodies which shall be concealed within the frame work of the body.

Another object is to provide shade supports which shall be accessible for purposes of adjustment and repair, and which shall be so mounted as to prevent rattle.

Other objects and structural details of the invention will appear from the following description taken in connection with the drawings, which form a part of this specification, and in which:

Fig. 1 is a view, partially broken away, of the interior of the body of a motor vehicle of the closed type, showing the application of the invention thereto;

Fig. 2 is a fragmentary detail, partially broken away and partially in section, showing the means for mounting the shade supports in a vehicle body;

Fig. 3 is a view, partially in elevation, and partially in section on the line 3—3 of Fig. 2, and Fig. 4 is a detail view showing the means for locking the shade concealing means in place.

It has been customary to provide the bodies of closed vehicles with shades for some of the windows thereof, and such shades are usually mounted on spring actuated rollers of conventional type, which are secured to brackets mounted on the interior of the vehicle body above the windows which they are adapted to cover. Such exposed shade mounting is more or less unsightly in appearance, and furthermore exposes the spring rollers to some danger of damage.

By this invention is provided means whereby such shade equipment is concealed within the body structure of the vehicle, so as to greatly improve the appearance of the interior thereof, and to protect the curtain rollers without diminishing the accessibility thereof for adjustment and repair.

In the drawing, at 10 is indicated the body of a vehicle of the closed type having a forward or driving compartment 11 and a rear compartment 12, separated by a partition 13. The vehicle has the usual roof or top 14 and is provided at its sides with suitable windows 16. A window 17 is also provided, in the usual manner, in the partition 13.

The frame of the vehicle body has the side members 18, connected by cross members 19, which are adapted to support the roof or top covering 21 and the interior lining 22 of the vehicle body. The windows 16 and 17 are provided with glass panes 23, adapted to be raised and lowered by means of the handles 24 in the well known manner. Above each of the windows 16, 17 is formed, within the frame member 18, a longitudinally disposed recess 26, adapted to contain a spring shade roller 27, which has the usual mounting pins 25 and which carries a window shade 28. The pin members 25 are of usual construction, one of them having a rectangular section by which it is secured against rotation, to operate the spring of the roller 27, as is well understood. The roller 27 may be of the usual type, and the shade 28 may be of any suitable material in use for this purpose.

The recess 26 extends lengthwise above each of the windows 16 and 17 a distance sufficient to receive the roller 27 of the shade provided for that window. In these recesses 26, at each end thereof, is mounted a bracket member 29 having an attachment portion or ear 30, secured to the frame member 18 in any convenient manner, as by means of the wood screws 32. The outwardly extending portions of the brackets 29 are adapted for cooperation with the pins 25 of the roller 27 as is well understood.

Removably secured to the top member 19 of the vehicle body is a cover member 33 adapted to cover the recess 26 and thus to conceal the roller 27 therein. The cover member 33 consists of a shield portion 36, and a flange portion 37 by means of which the shield portion is attached to the vehicle body. The flange portion 37, is provided at intervals, with keyhole slots 38, the larger ends of which are adapted to pass over the heads of suitable wood screws 39, which are driven into the frame members 19 to support the cover member 33. The narrow portion of each slot 38 is adapted to just embrace the shank portion of its screw 39 so that by placing the large ends of the slots 38 over the heads of the screws 39, and then sliding the cover member 33 longitudinally, the narrow portions of the slots 38 may be engaged beneath the overhanging heads of the screws 39 to support the cover member 33 in position, in a well known manner. Between the ends of each of the slots 38, the members 37 have a transversely disposed raised portion 41, provided by deformation of the metal, as shown in Fig. 4. As the cover member 33 is adjusted longitudinally, after the large ends of its slots 38 have been engaged over the heads of the screws 39, the projections 41 are forced under the heads of the screws 39 and are slightly deformed thereby, springing back into their original position after the screw heads have passed over them, thus locking the cover member 33 in position.

The lower edge of the shield portion 36 is brought into position parallel with and slightly spaced from the lower outside edge of the recess 26, thus forming an elongated slot 42, through which the shade 28 may pass. The shade is preferably provided with the usual spreader or stick 43, the ends of which may, if desired, be guided on suitable cables 44, as by means of members 45 secured to the ends thereof. The shades 28 may also be provided with suitable handles, such as 46.

It will be understood that various forms of the invention other than those described above may be used without departing from the spirit or scope of the invention.

What is claimed is:

1. In combination with a motor vehicle body, recessed frame members, brackets mounted in the recesses thereof, shade rollers on the brackets and flanged cover members adapted to conceal the rollers, said cover members having holes of key-hole formation in the flange portion thereof whereby they may be removably secured to the vehicle body, supporting members co-operating with the holes adapted to be concealed by the cover members when in position.

2. The combination with a motor vehicle body, of a frame member extending longitudinally of the body along the upper edge thereof, a window mounted in said body below said frame member, said frame member having a recess formed therein, said recess being enclosed by said frame member on three sides and open only on the side thereof toward the interior of the body, a shade roller mounted in said recess, said recess being of a size to substantially enclose said roller, said roller being positioned inwardly of the vertical plane of said window, a removable cover member extending substantially the entire length of and forming a closure for the inner open side of said recess, the lower edge of said cover member being spaced from said frame member to form a slot, and a shade on said roller adapted to be drawn down through said slot on the inner side of said window.

In testimony whereof I affix my signature.

ALFRED MOORHOUSE.